(12) United States Patent
Sandström et al.

(10) Patent No.: US 10,202,308 B2
(45) Date of Patent: Feb. 12, 2019

(54) COMPOSITE MATERIAL, ARTICLES COMPRISING SAME AND METHOD FOR MAKING SAME

(71) Applicant: Element Six Limited, Country Clare (IE)

(72) Inventors: Leif Sandström, Robertsfors (SE); Selim Dagdag, Momeres (FR); Lars-Ivar Nilsson, Robertsfors (SE); Karolina Hannersjö, Robertsfors (SE)

(73) Assignee: ELEMENT SIX LIMITED (IE)

( * ) Notice: Subject to any disclaimer, the term of this patent is extended or adjusted under 35 U.S.C. 154(b) by 0 days.

(21) Appl. No.: 14/784,494

(22) PCT Filed: Apr. 25, 2014

(86) PCT No.: PCT/EP2014/058518
§ 371 (c)(1),
(2) Date: Oct. 14, 2015

(87) PCT Pub. No.: WO2014/177477
PCT Pub. Date: Nov. 6, 2014

(65) Prior Publication Data
US 2016/0068444 A1      Mar. 10, 2016

(30) Foreign Application Priority Data

Apr. 30, 2013   (GB) .................. 1307804.3

(51) Int. Cl.
*C04B 35/5831*   (2006.01)
*C04B 35/581*    (2006.01)
*C04B 35/645*    (2006.01)

(52) U.S. Cl.
CPC ........ *C04B 35/5831* (2013.01); *C04B 35/581* (2013.01); *C04B 35/645* (2013.01);
(Continued)

(58) Field of Classification Search
CPC ..................... C04B 35/5831; C04B 35/581
See application file for complete search history.

(56) References Cited

U.S. PATENT DOCUMENTS 4,349,517 A * 9/1982 Lysanov ............ C04B 35/5831
                                                  423/290
4,642,298 A * 2/1987 Kuramoto ............ C04B 35/583
                                                   501/96.4
(Continued)

FOREIGN PATENT DOCUMENTS

CN         1749213 A      3/1996
CN       102557647 A      7/2012
(Continued)

OTHER PUBLICATIONS

Hackenberger et al., "Effect of stoichiometry on the phases present in boron nitride thin films," 1994, JVSTA, pp. 1569-1575.*
(Continued)

*Primary Examiner* — Laura A Auer
(74) *Attorney, Agent, or Firm* — Armstrong Teasdale LLP

(57) ABSTRACT

Composite material comprising aluminum nitride (AlN) material, less than 80 weight percent cubic boron nitride (cBN) grains dispersed within the AlN material and less that 5 weight percent sinter promotion material, the composite material including no more than about 1.5 percent porosity.

18 Claims, 1 Drawing Sheet

Figure 1:
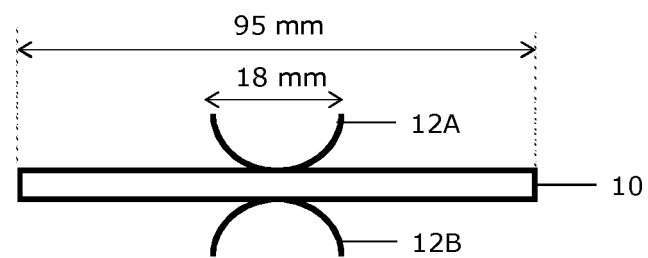

(52) U.S. Cl.
CPC .............................. *C04B 2235/386* (2013.01);
*C04B 2235/3865* (2013.01); *C04B 2235/5409*
(2013.01); *C04B 2235/5436* (2013.01); *C04B
2235/5445* (2013.01); *C04B 2235/6581*
(2013.01); *C04B 2235/661* (2013.01); *C04B
2235/72* (2013.01); *C04B 2235/721* (2013.01);
*C04B 2235/723* (2013.01); *C04B 2235/77*
(2013.01); *C04B 2235/9607* (2013.01)

(56) References Cited

U.S. PATENT DOCUMENTS

| | | | |
|---|---|---|---|
| 4,647,546 | A | 3/1987 | Hall, Jr. et al. |
| 4,656,052 | A * | 4/1987 | Satou .................. C23C 14/0021 204/164 |
| 4,960,734 | A * | 10/1990 | Kanai .................... C04B 35/583 264/122 |
| 5,326,380 | A | 7/1994 | Yao et al. |
| 2001/0008703 | A1 * | 7/2001 | Sakata .................... C22C 1/045 428/546 |
| 2010/0187766 | A1 * | 7/2010 | Lehnert .................. C25D 15/00 277/444 |
| 2013/0029175 | A1 * | 1/2013 | Umemura ................ C22C 29/02 428/627 |
| 2017/0022407 | A1 * | 1/2017 | Hatakeyama ......... C08L 101/00 |

FOREIGN PATENT DOCUMENTS

| | | |
|---|---|---|
| EP | 1932816 A1 | 6/2008 |
| GB | 2213500 A | 8/1989 |
| JP | 53117386 A * | 10/1978 |
| JP | S53117386 A | 10/1978 |
| JP | S5832073 A | 8/1981 |
| JP | 58-032073 * | 2/1983 ........... C04B 35/581 |
| JP | S627151 B2 | 2/1987 |
| JP | H08126903 A | 5/1996 |
| JP | H10-95673 A | 4/1998 |
| JP | 2008001536 A | 1/2008 |
| JP | 2008156142 A | 7/2008 |
| JP | 2009209005 A | 9/2009 |

OTHER PUBLICATIONS

Sithebe et al., "Pressure Infiltration of Boron Nitride Preforms with Molten Aluminum", Ceramics International, Elsevier, Amsterdam, NL, 34(6): 1367-1371 (2008).
PCT International Search Report from Application No. PCT/EP2014/058518, dated Jul. 16, 2014 (4 pages).
Combined Search and Examination Report from Application No. GB1407336.5, dated Oct. 23, 2014 (7 pages).
Combined Search and Examination Report from Application No. GB1307804.3, dated Oct. 23, 2013 (7 pages).
Ran LV et. al., "High pressure sintering of cubic boron nitride compacts with Al and AlN," Diamond and Related Materials, 17: 2062-2066 (2008).
"BN wiki page", last accessed on Feb. 16, 2017 (14 pages).
"Panadyne hBN data sheet", downloaded on Feb. 16, 2017 from www.panadyne.com (2 pages).
Dongliang et al., "Inorganic non-metallic material Engineering", China Material Engineering Dictionary, Mar. 31, 2006, vol. 8, Chemical Industry Press, China, p. 157.

* cited by examiner

COMPOSITE MATERIAL, ARTICLES COMPRISING SAME AND METHOD FOR MAKING SAME

CROSS-REFERENCE TO RELATED APPLICATIONS

This application is the § 371 national stage of International Application No. PCT/EP2014/058518, filed Apr. 25, 2014, which claims priority to Great Britain Application No. 1307804.3, filed Apr. 30, 2013.

This disclosure relates generally to composite material comprising cubic boron nitride, having high dielectric strength, methods of making same and articles comprising same, particularly but not exclusively articles for electrical and electronic components.

Chinese patent application publication number 1 749 213 discloses a method of making high performance aluminium nitride (AlN) ceramic material, including subjecting a tablet comprising AlN and 5 weight percent sintering material to a pressure in the range of 4 to 8 gigapascals (GPa) and temperature in the range of 1,500 degrees Celsius to 1,750 degrees Celsius.

Japanese patent application publication number 53-117,386 discloses a sintered body for use as a heat sink, having high thermal conductivity and comprising 40 to 90 percent cBN and the balance AlN, provided by ultra-high pressure sintering cubic boron nitride (cBN) powder and AlN powder containing less than 1 weight percent oxygen.

Ran et. al. (Ran, Lv, Jin Liu, Yongjun Li, Sicheng Li, Zili Kou and Duanwei He, "High pressure sintering of cubic boron nitride compacts with Al and AlN", *Diamond and Related Materials* 17, 2008, pages 2062 to 2066) discloses a compact comprising 20 weight percent AlN, substantially the balance of 80 weight percent consisting of cBN grains and a very small quantity of silicon (Si) in the form of silicon dioxide and silicon nitride, in which the silicon dioxide is believed to arise from impurities in the AlN raw material powder.

There is a need for material having high dielectric strength and relatively high thermal conductivity.

Viewed from a first aspect, there is provided composite material comprising aluminium nitride (AlN) material, less than 80 weight percent cubic boron nitride (cBN) grains (being grains that comprise or consist of cBN material, apart from practically unavoidable impurities) dispersed within the AlN material and less that 5 weight percent sinter promotion material, the composite material including no more than about 1.5 percent porosity (by volume of composite material).

Various arrangements, compositions and combinations of composite material and articles comprising composite material are envisaged by the disclosure, of which non-limiting and no-exhaustive examples are as follows.

The AlN may be polycrystalline, comprising AlN grains sintered together and having grain boundaries between them.

In various examples, the composite material may comprise at most 4 weight percent or at most about 2 weight percent sinter promotion material, or the composite material may be substantially free from sinter promotion material (apart from a minor content of practically unavoidable impurities, which may potentially have sinter promotion capability). In some examples, the composite material consists of AlN and cBN, apart from practically unavoidable impurities.

In various examples, the content of the cBN grains may be greater than 0 weight percent, at least 5 weight percent, at least about 15 weight percent, at least about 20 weight percent or at least about 30 weight percent of the composite material. In some examples, the content of the cBN grains may be at most about 70, at most about 60 weight percent, less than 40 weight percent or at most 37 weight percent of the composite material. For example, the content of the cBN grains may be about 20 to about 70 weight percent, about 30 to about 60 weight percent, greater than about 20 and less than about 40 weight percent, or at least about 20 at most about 37 weight percent of the composite material.

In some examples, the density of the composite material other than the cBN grains may be at least about 98 percent or at least about 99 weight percent of, or substantially equal to the density of crystalline AlN, being 3.26 grams per cubic centimeter ($g/cm^3$). Expressed numerically, the density of the composite material other than cBN may be at least 3.19 or at least about 3.23 grams per cubic centimeter ($g/cm^3$), or in the range 3.24 to 3.28 grams per cubic centimeter ($g/cm^3$).

In some examples, the composite material may contain no more about 1 percent or no more than 0.5 percent porosity, or the composite material may be substantially free from porosity.

In some examples, the cBN grains may include a mean content of inclusions of up to 50 parts per million (ppm) by weight.

In some examples, a substantial number or at least about fifty percent of the cBN grains may have a mean content of carbon of up to about 1,000 atomic ppm, up to about 700 atomic ppm or up to about 300 atomic ppm. The carbon may be present in solid solution and or contained in inclusions. The carbon may be in elemental form (as unreacted carbon atoms or ions) and or included in one or more kinds of chemical compound.

In some examples, a substantial number or at least about fifty percent of the cBN grains may contain super-stoichiometric content of nitrogen (N). The carbon may be present in solid solution and or contained in inclusions. The nitrogen may be present in solid solution and or contained in inclusions. The nitrogen may be in elemental form (as unreacted nitrogen atoms or ions) and or included in one or more kinds of chemical compound.

In some examples, a substantial number or at least about fifty percent of the cBN grains may contain chlorine. The chlorine may be present in solid solution and or contained in inclusions. The chlorine may be in elemental form (as unreacted chlorine atoms or ions) and or included in one or more kinds of chemical compound, such as one or more kind of chloride compound. For example, the cBN grains may contain inclusions, which may contain one or more kind of chloride compound.

In some examples, the cBN grains may comprise substantially stoichiometric amounts of boron and nitrogen, in which the atomic contents of boron and nitrogen are substantially the same. For example, the ratio of the atomic content of boron to that of nitrogen may be in the range of about 95 to about 105 percent. While wishing not to be bound by a particular theory, the electrical resistivity and or the dielectric strength of cBN crystals having non-stoichiometric amounts of boron or nitrogen may be lower than that of cBN crystals in which the boron or nitrogen are substantially stoichiometric.

Viewed from a second aspect, there is provided an article comprising or consisting of the composite material of this disclosure, having a pair of opposite major boundaries.

In some example arrangements, at least one of the opposite major boundaries may be partly or entirely coterminous with the composite material (in other words, the composite material may be exposed at one or both of the major boundaries). In some examples, a coating of material other than AlN may be provided at one or both of the opposite major boundaries.

In some example arrangements, each of the major boundaries may include a respective substantially planar area, and the planar areas may be directly opposite each other and be substantially parallel to each other. In some examples, the article may have a mean thickness between the opposite major boundaries of at least about 2 millimeters, at least about 3 millimeters or at least about 4 millimeters and at most about 20 millimeters, at most about 10 millimeters or at most about 7 millimeters. In some examples, the thickness may be 2 to 20 millimeters; for example, the thickness may be about 5 millimeters.

In some example arrangements, the article may have a dielectric strength of at least about 10 kilovolts per millimeter (kV/mm) or at least about 15 kilovolts per millimeter (kV/mm) measured between the major boundaries.

In some examples, the alternating current may be about 50 Hertz (Hz) and the thickness may be at least about 3 millimeters (mm) or at least about 4 millimeters, and at most about 6 millimeters (mm). For example, the thickness may be about 5 millimeters (mm).

Viewed from a third aspect, there is provided a making the composite material according to this disclosure, the method including forming a pre-sinter compact comprising AlN nitride grains, less than 80 weight percent cBN grains and less than 5 weight percent, less than about 4 weight percent or less than about 2 weight percent sinter promotion material, and subjecting the pre-sinter compact to an ultra-high pressure of at least about 3 gigapascals (GPa) and a sinter temperature of at least about 1,000 degrees Celsius to provide a sintered body comprising the composite material.

In some examples, the method may include blending cBN powder with AlN to provide a raw powder blend, forming the raw powder blend into a pre-sinter compact, and subjecting the pre-sinter compact to a pressure and temperature suitable for sintering the cBN and AlN powders in the solid state to provided sintered composite material.

In some examples, the pre-sinter compact may be in the form of a disc having a diameter in the range of about 55 to 100 millimeters (mm) and a thickness in the range of about 1 to 5 millimeters (mm). In some examples, the method may include subjecting the raw powder under a load of at least about 70 tons at ambient temperature. The load may be at most about 500 tons. In one example, the pre-sinter compact may be in the form of a disc having a diameter in the range of about 55 to 58 millimeters and a thickness in the range of about 3 to 4 millimeters.

In some examples, the method may include heat treating the pre-sinter compact in a vacuum (in other words, at a pressure substantially less than the ambient atmospheric pressure) and or in an inert atmosphere at a temperature of at least about 1,100 degrees Celsius, for example about 1,116 degrees Celsius. Such heat treatment may reduce the risk of cracks arising in the sintered article comprising the composite material.

In some examples, the ultra-high pressure may be at least about 4.0 gigapascals (GPa), at least about 4.5 gigapascals (GPa) or at least about 5 gigapascals (GPa). The ultra-high pressure may be up to about 10 gigapascals (GPa). In some examples, the sinter temperature may at least about 1,200 degrees Celsius, at least about 1,375 degrees Celsius or at least about 1,450 degrees Celsius. The sinter temperature may be at most about 2,500 degrees Celsius or at most about 1,500 degrees Celsius.

In various examples, the content of the cBN grains in the pre-sinter compact may be greater than 0 weight percent, at least 5 weight percent, at least about 15 weight percent, at least about 20 weight percent or at least about 30 weight percent of the composite material. In some examples, the content of the cBN grains in the pre-sinter compact may be at most about 70, at most about 60 weight percent, less than 40 weight percent or at most 37 weight percent of the composite material. For example, the content of the cBN grains may be about 20 to about 70 weight percent, about 30 to about 60 weight percent, greater than about 20 and less than about 40 weight percent, or at least about 20 at most about 37 weight percent of the composite material.

In some examples, a substantial number or at least about fifty percent of the cBN grains may have a mean content of carbon of up to about 1,000 atomic ppm, up to about 700 atomic ppm or up to about 300 atomic ppm. The carbon may be present in solid solution and or contained in inclusions. The carbon may be in elemental form (as unreacted carbon atoms or ions) and or included in one or more kinds of chemical compound.

In some examples, a substantial number or at least about fifty percent of the cBN grains may contain super-stoichiometric content of nitrogen (N). The carbon may be present in solid solution and or contained in inclusions. The nitrogen may be present in solid solution and or contained in inclusions. The nitrogen may be in elemental form (as unreacted nitrogen atoms or ions) and or included in one or more kinds of chemical compound. In some examples, the cBN grains may comprise substantially stoichiometric amounts of boron and nitrogen, in which the atomic contents of boron and nitrogen are substantially the same.

In some examples, a substantial number or at least about fifty percent of the cBN grains may contain chlorine. The chlorine may be present in solid solution and or contained in inclusions. The chlorine may be in elemental form (as unreacted chlorine atoms or ions) and or included in one or more kinds of chemical compound, such as one or more kind of chloride compound. For example, the cBN grains may contain inclusions, which may contain one or more kind of chloride compound.

In some examples, the pre-sinter compact may comprise sinter promotion material comprising one or more of silicon (Si) or yttrium (Y) in elemental form or contained in one or more kinds of chemical compound, such as silicon dioxide ($SiO_2$) or yttrium oxide ($Y_2O_3$). In some examples, the pre-sinter compact may be substantially free of sinter promotion material.

In some examples, the method may include processing the sintered body to alter its shape, dimensions and or surface finish. In some examples, the method may include depositing a coating onto at least an area of a surface of the sintered body or a finished article comprising composite material according to this disclosure.

Figure 2:
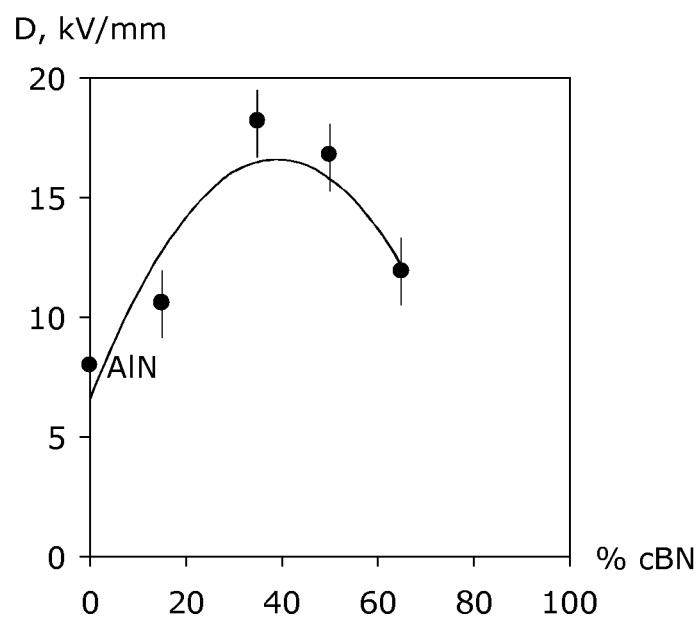

Non-limiting examples will now be described with reference to the accompanying drawings, of which FIG. 1 shows a schematic illustration of a side view of part of a pair of electrodes impinging opposite sides of a disc, as for measurement of the breakdown voltage of the disc, and FIG. 2, which shows a graph of the dielectric strength (in Volts per millimeter) of example composite material having thickness of 5 millimeters and comprising various amounts of cBN grains, shown on the horizontal axis.

Various example articles were made, in the form of discs having diameter of 95 millimeters and consisting of example composite material, and their respective dielectric strengths were measured. The example composite materials consisted (apart from practically unavoidable impurities) of cBN grains dispersed in an AlN matrix. Example articles were made using four different grades of cBN powder as raw material, each being thoroughly cleaned to remove as much impurity from the surfaces of the cBN grains as practically possible.

The cBN grains contained some impurities, which had likely been introduced during the process in which the cBN grains were synthesised. For example, binder additives comprising carbon may have been introduced into the raw materials for the cBN grains during a process of spray drying the raw materials. Such carbon impurity content is likely to be difficult to detect. Nevertheless, although the content of inclusions in the cBN grains may be up to 50 parts per million (ppm), composite material comprising grains of cBN of this type and AlN in equal weight amounts exhibits good electrical properties. While wishing not to be bound by a particular theory, this may be because the combined content of the carbon and the inclusions is very low. The carbon content in the AlN raw material powder is substantially higher. The carbon content in the AlN powder used is understood to be in the range of about 200 parts per million (ppm) and about 1,000 parts per million (ppm).

In examples in which the cBN grains had been synthesised in the presence of ammonium chloride (NH4Cl), which had been introduced as an additive in the synthesis process, the risk of a high carbon content in the cBN grains is expected to be very low to negligible. Such cBN grains are expected to contain super-stoichiometric nitrogen (N) in the lattice and chloride in the inclusions, which may have the effect of increasing the dielectric strength of the cBN, since carbon tends to result in increased electric conductivity and therefore less carbon may be desired to achieve increased dielectric strength. The cBN grades used to make example composite materials will be referred to as CBN-1, CBN-2, CBN-3 and CBN-4, each of which will be described briefly below.

CBN-1 comprised cBN grains having a mean size in the range of about 5 microns to 10 microns. These cBN grains appeared to contain a relatively high content of carbon impurities, which appear to arise from the carbon present in the hexagonal boron nitride (hBN) raw material used to manufacture the cBN. The volume of inclusions was the range of about 0.001 percent to about 0.008 percent, the density of the inclusions being the range of 1.8 to about 2.2 grams per cubic centimeter (g/cm$^3$). CBN-2 comprised cBN powder having mean grain size in the range of 20 to 50 microns.

CBN-3 and CBN-4 both comprised cBN grains appearing to have a relatively high content of nitrogen (a super-stoichiometric nitrogen content), which tends to give the powder a yellow or orange colour. The volume content of inclusions in CBN-3 was in the range of about 0.0025 percent to about 0.025 percent, the density of the inclusions being in the range of about 1.5 to about 2.5 grams per cubic centimeter (g/cm$^3$). CBN-3 contained chloride compounds, solvent material (lithium boron nitride, $Li_3BN_2$ and lithium nitride, LiN), hexagonal boron nitride (hBN, the low pressure phase of boron nitride), and boron oxide. It has relatively high strength at room temperature and relatively lower thermal stability.

In various examples to be described, two different grades of AlN powder were used as raw material. These two grades will be referred to as AlN-1 and AlN-2, and are briefly described below. It was found that the PCBN articles made using each of these grades had substantially the same dielectric strength, all else being equal.

AlN-1 powder comprised grains having mean size in the range of about 0.8 to 1.8 micron (d50, as measured by laser diffraction), specific surface area in the range of about 4.0 to 8.0 square meters per gram (m$^2$/g) and oxygen content of less than about 2.0 weight percent. Such AlN powder has been commercially available as Grade C AlN powder from H.C. Starck™. The thermal conductivity of a sintered body consisting of the AlN-1 material was found to be about 39 Watts per meter Kelvin (W/m·K).

AlN-2 powder comprised grains having mean size in the range of about 7.0 to 11.0 microns (d50, as measured by laser diffraction), specific surface area in the range of less than about 2.0 square meters per gram (m$^2$/g) and oxygen content of less than about 1.0 weight percent. Such AlN powder has been commercially available as Grade A AlN powder from HC Stark™. The thermal conductivity of a sintered body consisting of the AlN-2 material was found to be about 80 Watts per meter Kelvin (W/m·K).

First and second sets of example discs were made using grade CBN-1 grains, each set comprising three or four discs. The content of the cBN grains in the various examples in the first set were 15 weight percent, 35 weight percent, 50 weight percent and 65 weight percent, and the discs of the first set had a thickness of 5 millimeters (mm). The content of the cBN grains in the various examples in the second set were 50 weight percent, 72 weight percent and 88 weight percent, and the discs of the first set had a thickness of 3.5 millimeters (mm). Additional example discs having thickness of 5 millimeter (mm) and comprising 35 weight percent or 50 weight percent cBN grains were provided, the grades of cBN being CBN-2, CBN-3 and CBN-4.

Example articles consisting only of AlN and including no cBN grains were also made using the same method as for the articles comprising cBN grains (apart from the fact that no cBN grains were present in the pre-sinter compact). No sinter promotion material was introduced into the raw powder blend or the pre-sinter compact, and the content of any potential impurities is estimated to be less than about 1,000 parts per million by weight.

Pre-sinter compacts comprising the cBN grains (if any) and AlN powder were prepared by blending the cBN and AlN grains to provide a raw powder blend, which was deposited into a die having a diameter in the range of about 55 to 58 millimeters, and compacted under a load of about 70 tons. The amount of raw powder blend deposited in the die was such that the thickness of the pre-sinter compacts were 3.5 or 5 millimeters. The pre-sinter compacts were heat treated in a vacuum at a temperature of about 1,116 degrees Celsius, and then subjected to an ultra-high pressure of about 5 gigapascals (GPa) and a temperature of about 1,375 degrees Celsius to provide a sintered article comprising the composite material.

With reference to FIG. 1, each of the discs 10 was subjected to a measurement of its breakdown voltage, from which the respective dielectric strengths were calculated. Three or four discs 10 of each composition were used for each respective composite material constitution. The discs 10 had a diameter of 95 millimeters (mm) and a thickness of 3.5 or 5 between opposite major circular. The breakdown voltage of each disc was measured by contacting opposing hemispherical electrodes 12A, 12B, each having a diameter of 18 millimeters, centrally onto opposite major surfaces of the disc 10, and increasing a 50 Hertz (Hz) alternating potential difference across the disc until the breakdown voltage is reached and the disc 10 is incapable of sustaining the potential difference, which is evident from a sudden decrease in electrical resistance. The dielectric strength of each of the discs was calculated as the breakdown voltage in kilovolts (kV) divided by the thickness in millimeters (mm) of the disc. The dielectric strengths measured for the various example discs described above are summarised in the Table below and presented graphically in FIG. 2, in which the dielectric strength D is plotted against weight percentage of cBN in the respective example discs.

In order to assess the significance of whether the selection of AlN-1 and AlN-2 grades is used as raw material for the composite material, two sets of discs having thickness of 5 millimeters (mm) were made, the first set made using AlN-1 and the second set using AlN-2. Each disc in both sets consisted of 50 weight percent cBN and 50 percent AlN. The dielectric strength of the discs in both sets was substantially the same, being about 22 to 23 kilovolts per millimeter (kV/mm).

In general, the dielectric strength of the articles was found to depend on the thickness, the dielectric strengths of the 3.5 millimeter (mm) discs being substantially greater than that of the 5 millimeter discs of the same composite material constitution. A consideration in designing a component for an electrical or electronic system, in which the component comprises disclosed composite material, will likely be the selection of the thickness of the component such that a suitable balance of various countervailing aspects is achieved. For example, on the one hand it may be desired to make the component as thin as possible to reduce its weight and size and or to achieve a relatively higher dielectric strength, and on the other hand, it may be desired that it is sufficiently thick to be capable of withstanding a certain direct or alternating potential difference.

|  |  | Disc thickness | |
| --- | --- | --- | --- |
|  | cBN wt. % | 5 mm | 3.5 mm |
| CBN-1 | 0 | 8 kV/mm |  |
|  | 15 | 10.6 kV/mm |  |
|  | 35 | 18.2 kV/mm |  |
|  | 50 | 16.8 kV/mm | 22.5 kV/mm |
|  | 65 | 11.9 kV/mm |  |
|  | 72 |  | 13.4 kV/mm |
|  | 88 |  | 11.6 kV/mm |
| CBN-2 | 50 | 16 kV/mm |  |
| CBN-3 | 35 | 20 kV/mm |  |
| CBN-4 | 35 | 15.3 kV/mm |  |

The dielectric strength of disclosed articles tends to depend on the content of the cBN grains, and may depend on certain features of the cBN grains. For example, the shape of the cBN grains and or the content of inclusions or other impurities such as chloride compounds, carbon and nitrogen may influence the dielectric strength. Whilst wishing not to be bound by a particular theory, the electrical resistivity and or the dielectric strength of the cBN grains may depend to some extent on their content of inclusions and other impurities, which may affect the overall dielectric strength of the composite material.

Composite material according to this disclosure are likely to have the aspects of relatively high thermal conductivity and relatively high dielectric strength. Certain components for electrical or electronic systems comprising disclosed composite material may have reduced size and be capable of being cooled effectively in use, with the aid of fluid heat transportation, for example. Some example articles are likely to be capable of effective cooling in use by means of water.

Composite material comprising cBN and AlN according to this disclosure may find application in thermal management devices and devices requiring high electrical insulation, such as insulated gate bipolar transistors (IGBT) in high voltage environments Certain terms and concepts as used herein are briefly explained below.

As used herein, sinter promotion material is capable of promoting the sintering of polycrystalline material comprising cBN grains, particularly the sintering of cBN grains within a matrix comprising or consisting of AlN and or the sintering together of AlN grains comprised in the matrix.

The dielectric strength of an electrically insulating material is the maximum electric field strength that can be intrinsically withstood without failure of its electrical insulation properties, which is referred to as "electrical breakdown", or simply as "breakdown". The breakdown voltage of a body comprising dielectric material is the minimum potential difference across the body that will result in electrical breakdown. In general, dielectric strength is expected to decrease as the temperature of the material increases or the frequency of alternating current (AC) voltage increases. The breakdown voltage is expected to depend on the shape and size of the body and of the electrodes with which the electric field is applied, as well as the rate of increase of the electric field strength. In general, dielectric films tend to exhibit greater dielectric strength than thicker samples of the same material, and the dielectric strength of a given volume of material may be increased by stacking multiple thin layers of the material.

As used herein, the phrase "consisting of" is to be understood to mean "consisting of, apart from practically unavoidable impurities". Certain levels of certain impurities in any of various forms, such as inclusions and solid solution, may be present provided that they do not have a substantial effect on the properties or performance of the material in question, and provided that they are practically unavoidable or it is unviable to eliminate them in the process of manufacturing the material.

The invention claimed is:

1. Composite material consisting of aluminium nitride (AlN) material, greater than 30 weight percent and less than 80 weight percent cubic boron nitride (cBN) grains dispersed within the AlN material and sinter promotion material, the sinter promotion material being present in a quantity of less than 5 weight percent, and the composite material including no more than 1.5 percent porosity.

2. Composite material as claimed in claim 1, in which the composite material comprises at most 4 weight percent sinter promotion material.

3. Composite material as claimed in claim 1, in which the content of the cBN grains is greater than 30 weight percent to at most 70 weight percent.

4. Composite material as claimed in claim 1, in which the content of the cBN grains is greater than 30 weight percent to less than 40 weight percent.

5. Composite material as claimed in claim 1, in which the density of the matrix is substantially equal to the theoretical density of AlN.

6. Composite material as claimed in claim 1, substantially free of porosity.

7. Composite material as claimed in claim 1, in which the cBN grains include a mean content of inclusions of up to 50 parts per million (ppm) by weight.

8. Composite material as claimed in claim 1, in which the cBN grains have a mean content of carbon of up to 1,000 ppm.

9. Composite material as claimed in claim 1, in which the cBN grains contain super-stoichiometric content of nitrogen (N).

10. Composite material as claimed in claim 1, in which the cBN grains contain inclusions, and the inclusions contain a chloride compound.

11. An article comprising composite material as claimed in claim 1, having a pair of opposite major surfaces.

12. An article as claimed in claim 9, in which each of the major surfaces includes a respective substantially planar area, the planar areas being directly opposite each other and substantially parallel to each other.

13. An article as claimed in claim 9, having a mean thickness between opposite major sides of at least 2 millimeters and at most 20 millimeters.

14. An article as claimed in claim 9, having a dielectric strength of at least 10 kilovolts per millimeter (kV/mm).

15. An article as claimed in claim 9, having a dielectric strength of at least 15 kilovolts per millimeter (kV/mm).

16. A method of making the composite material as claimed in claim 1, the method including forming a pre-sinter compact consisting of AlN grains, greater than 30 weight percent and less than 80 weight percent cBN grains and sinter promotion material, the sinter promotion material being present in a quantity of less than 5 weight percent, and subjecting the pre-sinter compact to a pressure of at least 3 gigapascals (GPa) and a temperature of at least 1,000 degrees Celsius to provide a sintered body comprising the composite material, the composite material including no more than 1.5 percent porosity.

17. A method as claimed in claim 16, in which the pressure is at least 4 gigapascals (GPa) and the temperature is at least 1,200 degrees Celsius.

18. A method as claimed in claim 16, in which the pressure is at most 10 gigapascals (GPa) and the temperature is at most 2,500 degrees Celsius.

* * * * *